May 12, 1931. W. A. HARRIS 1,805,397
PNEUMATIC TIRE INFLATING AND DEFLATING APPARATUS
Filed July 26, 1927 4 Sheets-Sheet 1

INVENTOR
W. A. Harris,
BY
ATTORNEYS May 12, 1931.   W. A. HARRIS   1,805,397
PNEUMATIC TIRE INFLATING AND DEFLATING APPARATUS
Filed July 26, 1927   4 Sheets-Sheet 2

INVENTOR
W. A. Harris,
BY
ATTORNEYS

INVENTOR
W. A. Harris,
BY
ATTORNEYS

Patented May 12, 1931

1,805,397

UNITED STATES PATENT OFFICE

WILLIAM A. HARRIS, OF GREENVILLE, SOUTH CAROLINA

PNEUMATIC TIRE INFLATING AND DEFLATING APPARATUS

Application filed July 26, 1927. Serial No. 208,612.

My invention is a pneumatic tire inflating and deflating apparatus and an object thereof is to provide an apparatus of this character which is automatically operable to either inflate or deflate a pneumatic tire to a predetermined air pressure.

The invention further provides a pneumatic tire inflating and deflating apparatus wherein an air control mechanism is actuated through the medium of air pressure, thereby positively causing a predetermined quantity of air to pass to or from a tire.

It is another object to provide an inflating and deflating apparatus having signalling means operable to indicate the inflating or deflating operations and which are continuously actuated during the entire period while air pressure is passing to or from the tire.

The invention further contemplates an air pressure apparatus for pneumatic tires wherein air pressure from the storage tank is permitted to exhaust to the atmosphere in the event air pressure in a tire is a predetermined one prior to an attempt to inflate the tire to a predetermined pressure thus obviating all liability of a blow-out by excess pressure.

With the preceding and other objects and advantages in mind the invention consists in the novel combination of arrangements, constructions and arrangement of parts to be hereinafter specifically referred to, claimed and illustrated in the accompanying drawings, wherein:—

Referring to the invention in detail a hollow rectangular vertically arranged casing 5 having a circular air trap or drum 6 in its upper end, is provided and is supported upon a hollow base 7. A removable rear wall 8 is provided for the casing 5 while the base 7 has a removable side wall 9.

Figures 1, 2:
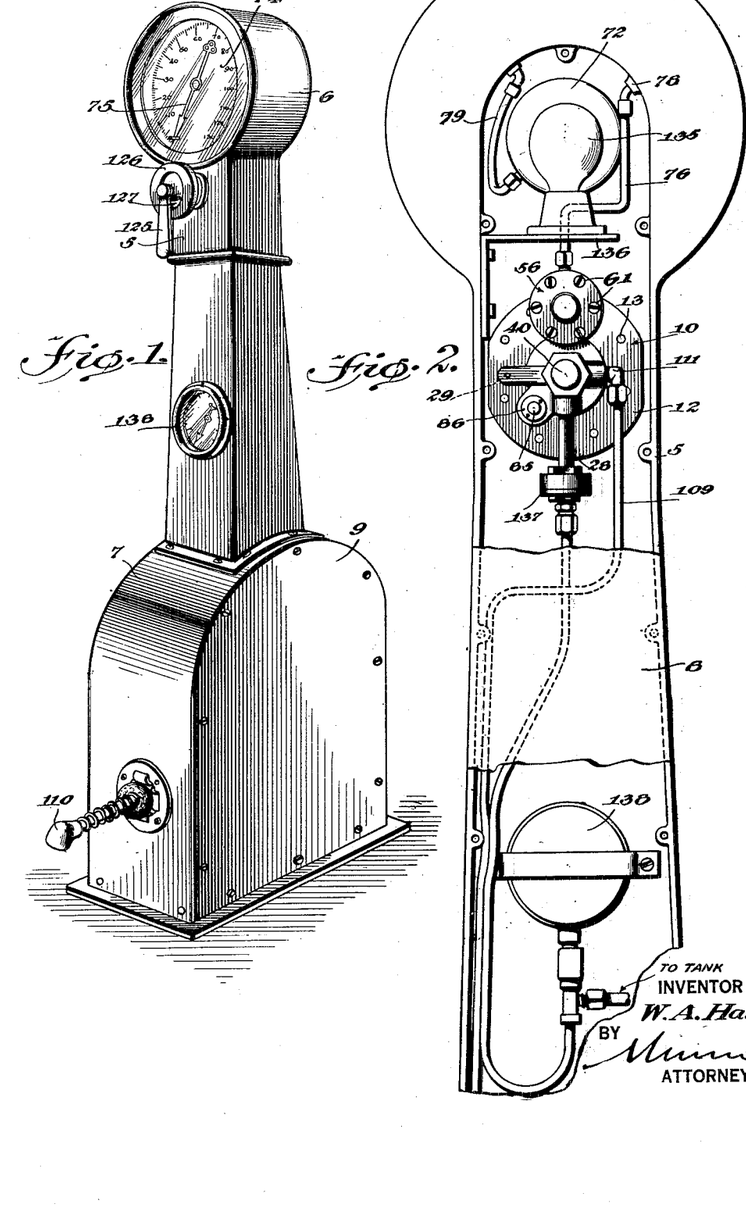
Figure 1 is a perspective of my pneumatic tire inflating and deflating apparatus.
Figure 2 is a rear elevation with parts of the casing removed to illustrate the interior mechanism.
Figures 3, 4:
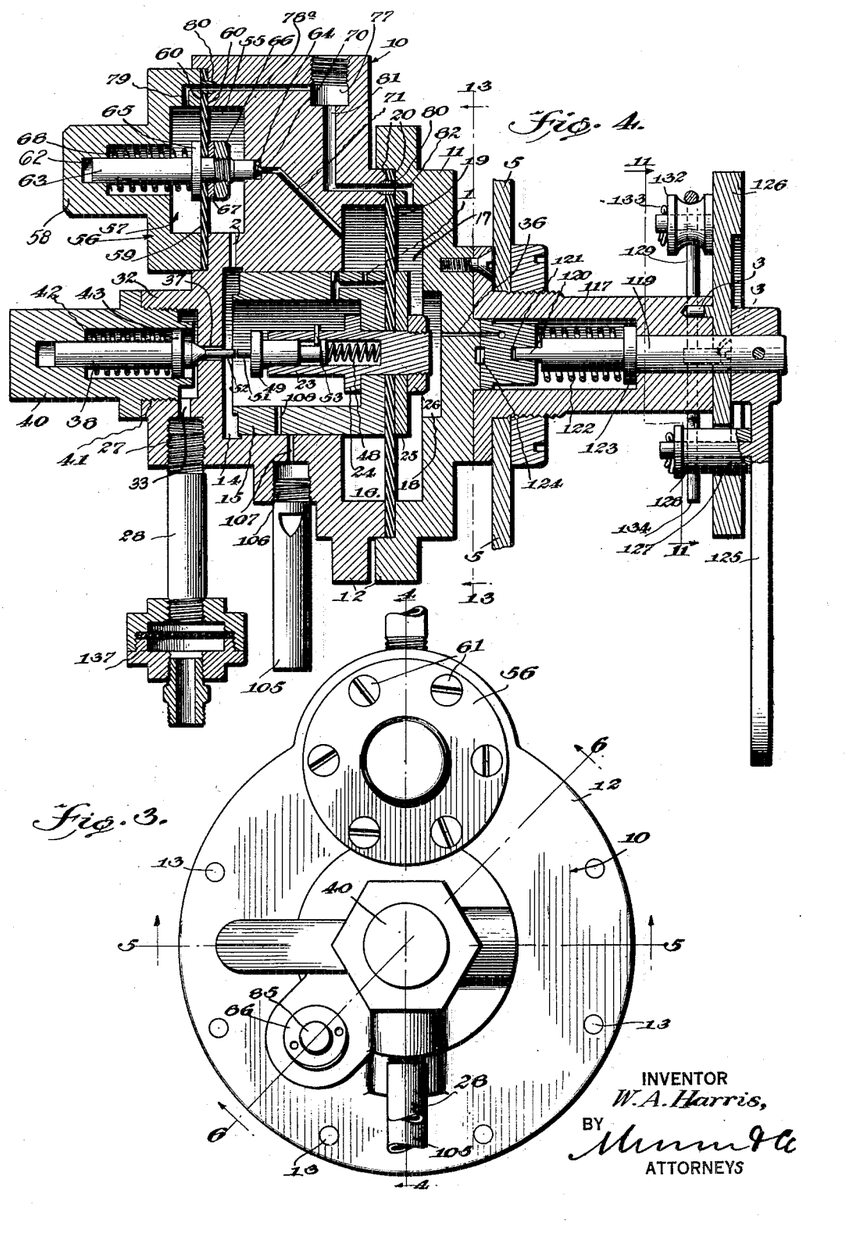
Figure 3 is an end elevation of the air control unit embodied in the invention.
Figure 4 is a vertical sectional view of the same taken on line 4—4 of Figure 3.

The present invention includes a unit mounted in the casing having communication with a suitable air reservoir and the air trap 6 for automatically inflating and deflating pneumatic tires, which comprises a pair of circular castings or sections 10 and 11 forming a casing and having abutting annular flanges 12 detachably secured together by suitable fastenings 13. As illustrated in Figure 4 the section 10 has formed therein a longitudinal extending central cylindrical piston chamber 14 in which a pressure responsive piston 15 is mounted and a central air chamber 16 at its inner end of a materially larger diameter than this chamber 14. An air chamber 17 of the same diameter as the air chamber 16 but of lesser depth than the latter is provided in the inner face of the section 11 and is further provided with a central recess 18 in alignment with the piston 15 to permit maximum travel of the latter.

Co-acting with the piston and separating the air chambers 16 and 17 is a flexible diaphragm 19 whose edges are engaged and clamped by opposed circular shoulders 20 provided on the abutting ends of the casing sections. The inner end of the piston 15 is closed and has a bleed 1 in one side adjacent its closed end to permit pressure to slowly leak from the piston chamber to the air chamber 16. A circular opening 21 in the closed end of the piston coincides with a central opening 22 in the flexible diaphragm and passing through these openings is one end of a cylindrical member 23 arranged concentrically within the piston 15 and having an annular flange 24 abutting the closed end of the piston. A clamping disk 25 received on the member 23 is held in clamping engagement with the flexible diaphragm by a nut 26 threaded upon the projecting end of this member 23.

To permit the passage of air from the main supply pipe 28 leading from a suitable storage tank or reservoir (not shown) to the air compartment 17, the casing sections 10 and 11 (see Fig. 5) are formed with L-shaped conduits 29 and 30 respectively having communication with each other by way of a metallic duct 31 passing transversely through the flexible diaphragm adjacent its outer edge. At one end the conduit 29 communicates with a hollow boss 32 formed with and projecting laterally from the inner end of the casing section 10 and in one side of which the air supply pipe 28 is threaded as at 27, the supply pipe communicating with the hollow boss by way of a transverse port 33.

At one end, the conduit 30 has a lateral branch 34 which opens upon the outer face of a lateral central projection 35 formed centrally on the outer face of the casing section 11. An air inlet port 36 extends entirely transversely through the casing section 11 and opens upon the outer face of the projection 35 and is adapted to be brought into communication with the lateral branch 34 by means of a manually operable valve to be subsequently referred to. It will be observed that air from the supply pipe normally passes into the hollow boss 32 and through the communicating conduits 29 and 30 and into the air chamber 17 by way of the inlet port 36.

For the purpose of normally preventing the passage of air to the piston chamber 14 and air chamber 16 through the port 37 leading to the hollow boss and piston chamber, a reciprocable valve 38 is normally engaged with a valve seat 39 formed upon the outer end of this port 37. The valve 38 is mounted in a cylindrical valve chamber 40 threaded in the hollow boss 32 as at 41 and is normally urged to closed position by an expansible coil spring 42 encircling the stem of the valve and engaging a collar 43 formed thereon at its inner end.

To unseat the valve 38 and retain it in open position at a predetermined time to permit air pressure to flow into the tire until the latter has been inflated to a predetermined degree a valve holding member 44 is provided. This valve holding member comprises a cylindrical body 45 slidably mounted in the longitudinal bore 46 formed in the member 23 and terminates in a head 47 upon its inner end engaged by an expansible coil spring 48 accommodated in the bore 46. At its outer end a larger head 49 is provided having a central lateral lug 51 arranged coaxial with the port 37 and in longitudinal alignment with a stem 52 projecting from the inner end of the valve 38 and into the piston chamber 14.

The valve holding member is normally projected to a position where its head 49 is slightly in advance of the inner end of the member 23, the movement of this valve holding member being governed by a stop pin 53 projecting laterally within the bore 46 in the path of the head 47. From the description of the valve unseating member it will be apparent that as the diaphragm and piston move to the left, the lug 51 engaging the stem 52 will cause the valve holding member to move inwardly against the resiliency of the spring 42 until the head 49 abuts the adjacent end of the member 23. The continued movement, however, of the piston pushes the valve 38 from its seat, retaining it unseated and allowing air to pass into the piston chamber 14.

An air pressure chamber 55 is provided within the outer face of the casting section 10 above and communicating with the piston chamber by way of a port 2 in the section 10. Opposed to the pressure chamber 55 is a circular cap 56 provided with an air chamber 57 in its inner face and having a cylindrical projection 58 closed at its outer end. A flexible diaphragm 59 is held between the inner face of the cap and circular recesses 60 in the outer face of the casting section 10, removable fastenings 61 being provided to detachably hold the cap in position. Passing centrally through the diaphragm 59 and reciprocable in a guide or bore 62 in the projection 58 is a valve stem 63 formed with a valve element 64 at its inner end. A collar 65 is formed on the valve stem adjacent one end and engaging one face of the diaphragm while a nut 66 threaded upon the valve stem upon the opposite side of the diaphragm holds a washer 67 against this face of the diaphragm. Received in the hollow projection 58 and encircling the valve stem is an expansible coil spring 68 which bears against the collar 65 and one end of the hollow projection 58 to normally urge the valve stem forwardly holding the valve element 64 on a valve seat 70 at one end of a by-pass 71 in the casing section 10 communicating with air chambers 55 and 16.

A suitable air gauge 72 is supported in the upper end of the casing 5 and includes a graduated dial 74 and a pressure responsive indicating hand 75 movable therearound. The air trap 6 has communication with the unit by way of a short pipe 76 having one end threaded in a threaded bore 77 in the casting section 10 and its opposite end connected with the air trap at one side as at 78. Communication is established between the gauge 72 and air trap by way of a short inlet pipe 79.

The air chambers 17—57, air trap, and gauge are all in communication and at all times have the same air pressure therein. This communication is established by way of a transverse duct 78a in the section 10 communicating at one end with the bore 77 and at its opposite end with an L-shaped passage way 79 in the cap leading to the chamber 57. An L-shaped duct 81 also leads from the bore 77 and has one end coinciding with an L-shaped duct 82 leading into the air chamber 17. Communication is had between the ducts 78, 79 and 81 and 82 thru the diaphragms by metallic ducts 80 passing thru these diaphragms.

Audible inflation signalling means, which in this instance is a whistle 85, (see Fig. 6) is received in an internally threaded nipple 86 projecting from one end of the casting section 10 and longitudinally adjustably threaded in the enlarged end 87 of a longitudinal bore 88 in this casing section. This bore 88 has a reduced inner end 89 communicating with the air chamber 16 and constituting a guide for one end of a slide valve 90 operable in the bore to control the operation of the whistle 85. A sleeve 91 closed at its outer end is arranged coaxial within the outer end of the bore 88 having an annular flange 92 engaging the inner end of the nipple 86. A compressible packing washer or sleeve 93 embraces the sleeve 91 and when the nipple 86 is adjusted inwardly compresses this washer to produce an air tight joint as the flange impinges against the washer.

Figures 5, 6, 7, 8, 9, 10:
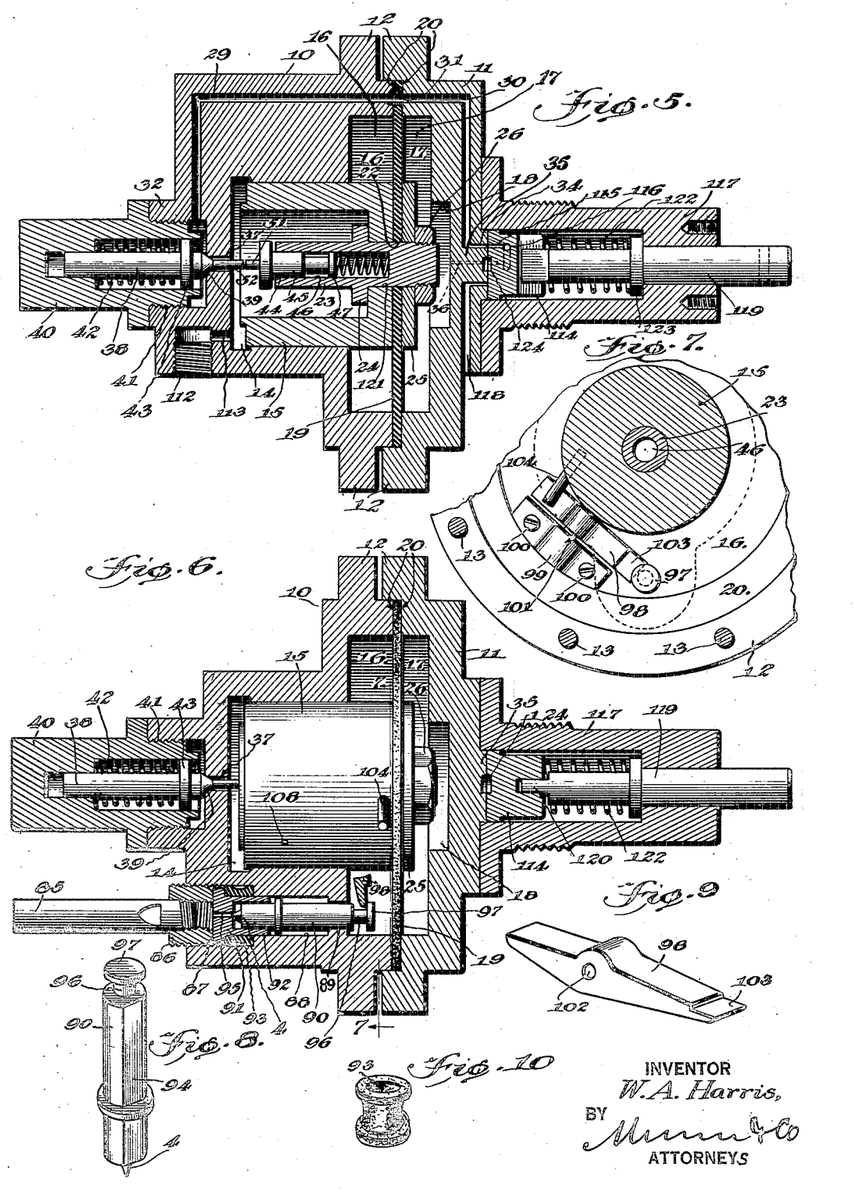
Figure 5 is a horizontal sectional view taken on line 5—5 of Figure 3.
Figure 6 is a sectional view taken on line 6—6 of Figure 3 and illustrating the parts in operated position for inflating a tire.
Figure 7 is a fragmentary sectional detail view taken on line 7—7 of Figure 6.
Figure 8 is a perspective of the signal control valve.
Figure 9 is a perspective of the signal valve actuating trip.
Figure 10 is a perspective of the packing element used in conjunction with the signal valve.
Figures 11, 14:
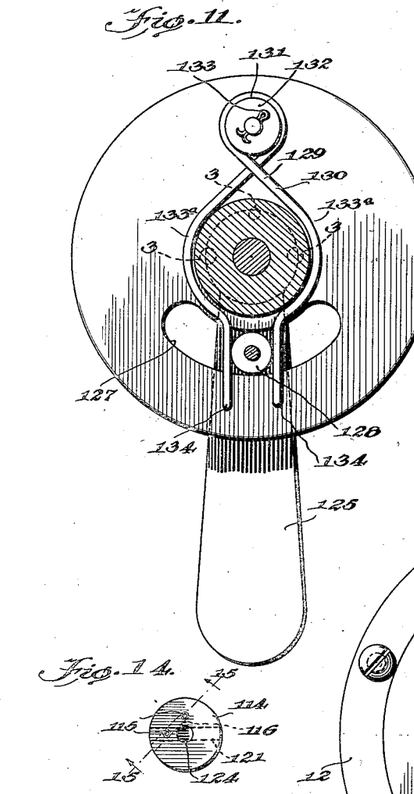
Figure 11 is a vertical sectional view taken on line 11—11 of Figure 4.
Figure 14 is a plan view of the manually operable control valve embodied in the invention.
Figure 12:
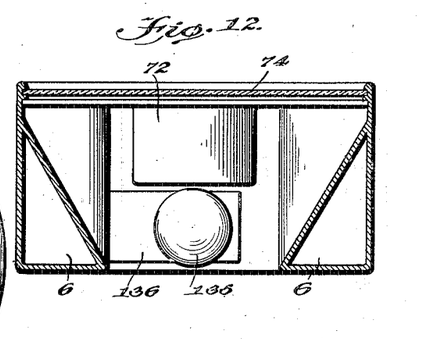
Figure 12 is a horizontal sectional view through the head of the casing.
Figure 13:
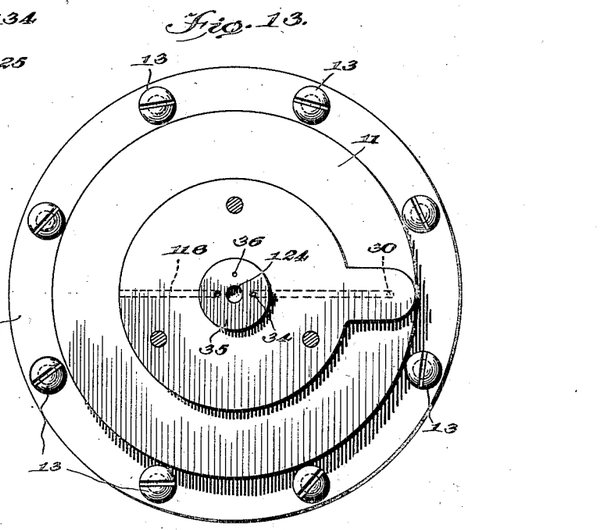
Figure 13 is a vertical section taken on line 13—13 of Figure 4.
Figure 15:
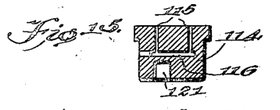
Figure 15 is a transverse sectional view of the same and taken on line 15—15 of Figure 14.
Figure 16:
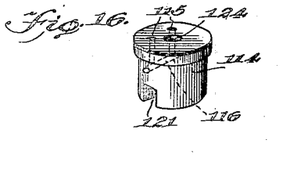
Figure 16 is a perspective of this valve.

As illustrated in Figure 8 the valve 90 is substantially cylindrical with a flat longitudinal face 94 which permits the passage of air from the air chamber 16 to the sleeve 91. The valve has a tapered outer end 4 adapted to seat against and close a port 95 in the closed end of the sleeve 91. At its inner end the valve is formed with a reduced neck 96 which is disposed in the chamber 19 and terminates in a head 97.

To automatically actuate the valve to open position to permit sounding of the whistle during the inflation operation, a trip 98 is pivotally supported intermediate its ends at one side of the piston with one end disposed between the head 97 and adjacent end of the valve. To mount the trip a bearing 99 is secured to one of the side walls of the air compartments 19 by detachable fastenings 100 and carries a laterally extending fixed pivot pin 101 receiving the transverse bore 102 in the trip 98, the bore being located off-center to cause the trip to normally assume an angular position with its lower end resting against the head 97. At its lower end the face of the trip which contacts with the head is cut away or recessed as at 103. A trip actuating pin 104 projects laterally from the piston adjacent the diaphragm 21 in the path of the upper end of the trip as particularly illustrated in Figure 7 so that upon forward movement of the piston the trip will be rocked on its pivot retracting the valve to open the port 95 and consequently the whistle is sounded. In order to effect correct operation of the valve 90 it is necessary to have the head 97 in such position as to be engaged by the trip and permit this trip to have a sufficient range of pivotal movement as to slide the valve back and forth. This is accomplished by adjustment of the nipple 86.

A deflation signal in the form of a whistle 105 is also provided, the latter being threaded into a bore 106 in the casing section 10 below the piston chamber and communicating therewith by a transverse port 107. This signal is operable by air transmitted to the piston chamber 14 from a pneumatic tire which passes into the signal through a transverse port 108 in the piston when this port is in registration with the port 107 due to the rearward movement of the piston by the tire air pressure.

An air hose 109 equipped with a suitable valve stem engaging a head or chuck 110 is provided and has one end connected to an L-fitting 111 which in turn is threaded into a lateral hollow boss 112 (see Fig. 5) formed with the casing section 10 to one side of the hollow boss 32, the hollow boss 112 communicating with a piston chamber by way of a by-pass 113.

For controlling the operation of the apparatus a rotatable circular valve element 114 having a pair of parallel ports 115 which open upon the outer face of the valve element and communicating at their inner ends by a by-pass 116 is provided. This valve element is rotatably mounted in a valve casing 117 projecting laterally from the casing section 11 surrounding the projection 35 and is adapted to be disposed in positions where its ports 115 will either register with the ports 34 and 36 to permit air pressure of the storage tank to pass into the air compartments 17 and 57, air trap and gauge or with the port 36 and a by-pass 118 open at one end upon the outer face of the projection and its opposite end leading to the atmosphere, to exhaust air from the air chambers 17 and 57, air gauge, and trap so as to bring about a predetermined operating pressure in these chambers and air trap.

Extending longitudinally within the valve casing 117 and projecting from one end thereof is a rotatable valve actuating shaft 119 formed with a reduced rectangular end 120 accommodated in a slot 121 arranged centrally in the outer face of the valve element. This valve element has a slight sliding fit on the reduced end so that it will be held in air-tight engagement with the projection 35 by an expansible coil spring 122 encircling the shaft and bearing at one end against the valve element and at its other end against a collar 123 fixed to the shaft.

To eliminate uneveness on the inner face of the valve element due to the fact that the central zone of this face becomes worn first because of increased friction at this point a central recess 124 is provided therein.

With the pressure controlling unit supported in the casing 5 the valve actuating shaft projects laterally from the front of the casing directly below the dial 74, and carries an operating handle 125 at its outer end. Received on the operating shaft, rearwardly of the handle 125 and held against rotation by fastenings 3 securing it to the valve casing 117 is a disk 126 having an arcuate slot 127 directly below the valve operating shaft in which a roller 128 projecting laterally from the handle is received and guided.

To return the handle and valve to normal or vertical position a spring device 129 engaging the roller 128 at opposite sides is provided. The spring device comprises a length of resilient wire 130 formed with a loop 131 embracing a disk 132 projecting laterally from the inner face of the disk 126 directly above the shaft and held thereon by removable fastening 133. From the loop the length of wire is extended in crossed relation and bent to provide a pair of coacting oppositely longitudinally bowed clamps 133a which resiliently embrace the valve casing 117 and terminate in parallel arms 134 disposed upon opposite sides of the roller 128 to engage the same at diametrically opposite points. It will be observed that upon movement of the handle to the right or left the spring device will be tensioned so that upon release of the handle the spring device will function to return it to normal position.

To illuminate the dial 74 at night an illuminating bulb 135 supported within the upper end of the casing 5 rearwardly of the graduated scale upon a shelf 136 secured within the casing, is provided.

If desired a suitable air filter 137 may be installed in the air line 28 between the supply tank (not shown) and pressure responsive unit. Also a conventional gauge 138 may be mounted in a front wall of the casing 5 for indicating the tank pressure.

*The operation*

The valve 114 is first actuated to bring its ports into registration with the ports 34 and 36 in the casting section 11 and held in this position until the pressure responsive hand 75 designates the desired pressure to be introduced into the tire. The course of the air being as follows: The air from the air line 28 leading from the storage tank first passes into the central boss 32 through the conduits 29, 30 and branch 34, thru the valve 14 and discharged by way of port 36 into the air chamber 17 from where it flows into the conduits 81 and 78a and empties into the pressure chamber 57, air trap and gauge. At this time the pressure in the air trap and air chambers 17 and 57 is the same and this pressure in conjunction with the expansible spring normally holds the valve element 64 tight on its seat.

The pressure responsive hand 74 now indicating a desired pressure, the valve 114 is operated to sever communication between the air line and air chamber 17.

When sufficient air pressure has accumulated in the air chamber 17, the diaphragm 19 is flexed to the left carrying the piston 15 forwardly, engaging the lug 51 of the resiliently urged valve holding member with the stem 52 of the valve 38.

At the same time the pin 104 engaging the trip 98 rocks the latter, sliding the valve 90 forwardly uncovering the port 95 leading to the whistle 85. Continued movement of the piston to the left depresses the valve holding member against the tension of its spring 47 until its head 49 abuts the adjacent end of the member 23 holding this valve holding member rigid so that the lug 51, pushing on the stem 52 will unseat the valve 38 permitting tank pressure to pass into the piston chamber and directly to the tire by way of the hose 109. As the pressure builds up in the tire it also builds up in the piston chamber and air chambers 16 and 55 during this inflation period, a sufficient amount of air passes through the whistle 85 by way of port 95 to sound a continuous signal. Instantaneous with the inflation of the tire to the desired pressure, the pressure in the air chamber 55 will be slightly greater than the pressure in the chamber 57 flexing the diaphragm 59 to the left permitting a rush of air through the by-pass 71 causing a quick accumulation of air in the chamber 16 which, with the pressure confined within the piston is sufficient to return the diaphragm 19 and piston to normal position against the pressure in the air chamber 17 instantaneously, which due to the valve holding member moving away from the stem allows this valve 38 to quickly seat, cutting off further pressure to the tire.

To deflate a tire to a degree at which the pressure responsive hand is set, the valve stem engaging head or chuck 110 is engaged with the valve stem of a pneumatic tire holding its check valve in open position so that air pressure from the tire will be conducted into the piston chamber and air chamber 55, unseating the valve 64 as above stated, and moving the piston and diaphragm forwardly to bring the port 108 in register with the port 107 permitting the escape of air pressure to the atmosphere through the whistle 105, sounding the latter during the entire deflation period. In this connection, it is pointed out that in practice, the deflation whistle is of a different tone than the inflation whistle so that the deflating and inflating operations will be obvious to the operator.

In the event that the pressure responsive hand shows more pressure than desired, the apparatus may be readily reset to exhaust a sufficient amount of air from the air trap and air chambers 17 and 57. This operation is accomplished by rotating the valve 114 until its ports register with the ports 36 and 118 which allows the surplus air to exhaust to the atmosphere and the pressure responsive hand to rotate counter-clockwise until it coincides with the graduation on the dial representing the desired pressure.

I claim:

1. In combination, an air trap, a casing having air compartments, one of which has communication with the air trap, a pressure responsive element separating the air compartments, means for supplying a predetermined air pressure to the air trap and communicating air compartment to move the pressure responsive element in one direction, and means operable incident to the movement of the pressure responsive element to permit tire inflating pressure to pass into the other air compartment and conducted to a tire, the tire pressure being communicated to the last mentioned chamber when the tire has been inflated to a predetermined degree to actuate the pressure responsive element to normal position to cut off further air supply to the tire, and a signal moved to operative position prior to the admission of tire inflating pressure into the compartment and retained in said position by the pressure responsive element during the inflation operation.

2. In combination, an air trap, a casing having air compartments, one of which has communication with the air trap, a pressure responsive element separating the air chambers, means for supplying a predetermined air pressure to the air trap and communicating air chamber to move the pressure responsive element in one direction, and means operable incident to the movement of the air responsive element to permit tire inflating pressure to pass into the other air chamber and conducted to the tire, the tire pressure being communicated to the last mentioned chamber when the tire has been inflated to a predetermined degree to actuate the pressure responsive element to normal position to cut off further air supply to the tire, an audible signal, and a valve normally preventing the passage of air through the signal and operable prior to admission of tire inflating air into its air chamber to permit the passage of air through the signal by the pressure responsive element during the inflation operation.

3. In combination, a casing having pairs of air compartments, a pressure responsive element separating the compartments of each pair and one compartment of each pair having communication with one compartment of the other pair, a normally closed valve carried by one pressure responsive element to normally sever one of said communications, a compressed air source communicating with both of said severed compartments, means normally closing communication between the air source and said severed compartments, said means being operable to establish communication between said two severed compartments and the air source by the other of the pressure responsive elements actuated in one direction by the air in its compartment, the other pressure responsive element being operable to unseat its valve to establish communication between two compartments to permit reverse operation of the said one other pressure responsive element when a predetermined air pressure has passed from the source.

4. In combination, a casing, a pair of diaphragm chambers, a diaphragm in each chamber forming a pair of compartments in each chamber, the chambers having communications at opposite sides of the diaphragms, a valve carried by one diaphragm normally severing communications between two compartments of said chambers, a source of pressure leading to the diaphragm chambers at one side of each diaphragm, manual means controlling the passage of air to the other compartments of said diaphragm chambers, a normally closed valve severing communication between the air source and the first-named compartments of said diaphragm chambers and operable to open position by actuation of one diaphragm by air pressure at one side thereof, the other diaphragm being actuated to unseat its valve to establish communication between the first named compartments of said diaphragm chambers to return the first operated diaphragm to normal position when the pressure at one side of each diaphragm is sufficient to overcome the initial pressure at the opposite side of the diaphragms.

5. In combination, a casing, a pair of diaphragm chambers, a diaphragm in each chamber forming a pair of compartments therein, the chambers having communications at opposite sides of the diaphragms, a valve carried by one diaphragm normally severing communication between two compartments of said chambers, a source of pressure leading to the diaphragm chambers at one side of each diaphragm, manual means controlling the passage of air to the other compartments of the diaphragm chambers, a normally closed valve severing communication between the air source and the said two compartments of said diaphragm chambers and operable to open position by actuation of one diaphragm by air pressure at one side thereof, the other diaphragm being actuated to unseat its valve to establish communication between the said two compartments of said diaphragm chambers to return the first actuated diaphragm to normal position when the pressure at one side of each diaphragm is sufficient to overcome the initial pressure at the opposite side of each diaphragm, and a pneumatic signal operable while the first actuated diaphragm is in actuated position.

6. In combination, a casing having diaphragm chambers, a diaphragm in each chamber forming a pair of compartments therein, the chambers having communications at opposite sides of the diaphragms, a valve carried by one diaphragm and normally severing communication between two of the compartments of said chambers, means for supplying predetermined air pressure to the other compartments to one side of each diaphragm, a normally closed air pressure controlled valve operable to open position to admit air to said two compartments at the opposite side of the diaphragms upon actuation of one of the diaphragms by the predetermined air pressure, the other diaphragm being actuated to unseat its valve to establish communication between the said two compartments of the diaphragm chambers and cause the first actuated diaphragm to return to normal position permitting the pressure controlled valve to close when an air pressure equal to the predetermined pressure has accumulated in said two compartments at the side of the diaphragms opposite the side subjected to the predetermined pressure.

7. In combination, a casing having diaphragm chambers, a diaphragm in each chamber forming a pair of compartments therein, the chambers having communications at opposite sides of the diaphragms, a valve carried by one diaphragm and normally severing communication between two of the compartments of said chambers, means for supplying predetermined air pressure to the other compartments to one side of each diaphragm, a normally closed air pressure controlled valve operable to open position to admit air to the said two compartments at the opposite side of the diaphragms upon actuation of one of the latter by the predetermined air pressure, the other diaphragm being actuated to unseat its valve to establish communication between the said two compartments of the diaphragm chambers and cause the first actuated diaphragm to return to normal position permitting the pressure control valve to close when an air pressure equal to the predetermined pressure has accumulated in the said two compartments at the side of the diaphragms opposite the side subjected to the predetermined pressure, and a pneumatic signal operable in the event that the air pressure is greater than the predetermined air pressure.

8. In combination, a casing having diaphragm chambers, a diaphragm in each chamber forming a pair of compartments therein, the chambers having communications at opposite sides of the diaphragms, a valve carried by one diaphragm and normally severing communication between two compartments of said chambers, means for supplying predetermined air pressure to the other compartments to one side of each diaphragm, a normally closed air pressure controlled valve operable to open position to admit air to the said two compartments at the opposite side of the diaphragms upon actuation of one of the latter by the predetermined air pressure, the other diaphragm being actuated to unseat its valve to establish communication between said two compartments of the diaphragm chambers and cause the first actuated diaphragm to return to normal position permitting the pressure controlled valve to close when air pressure equal to the predetermined pressure has accumulated in said two compartments at the side of the diaphragms opposite the side subjected to the predetermined pressure, and a pneumatic signal operable in the event that the air pressure is greater than the predetermined air pressure, the operation of the signal permitting exhaust of the air pressure until it equals the predetermined air pressure.

9. In combination, a casing having air chambers therein, one of which has communication with a source of compressed air, a pressure responsive element separating the chambers, means for manually controlling pressure from the air source to one of the chambers, means normally preventing the passage of air from the air source to the other chamber, and rendered operative to permit air to pass from the source into said other chamber upon admission of the predetermined pressure into the first mentioned chamber, a pneumatic signal communicating with said other chamber, a normally closed valve rendering the signal inoperative, means operable by the actuation of the pressure responsive element prior to the admission of air to said other chamber to open the signal valve, and operable to close the valve upon return of the pressure responsive element to normal position incident to pressure in said other chamber overcoming the resistance offered by the pressure in the first mentioned chamber.

10. In combination, a casing having a pair of air chambers, a pressure responsive element separating each chamber into compartments, the casing being provided with a common air pressure inlet leading to one compartment of each chamber, means normally severing communication between the common air inlet and the other compartment of each chamber, the air pressure in said first mentioned compartments being operable to render said means inoperative whereby to permit pressure to enter the said other compartments, a pneumatic signal in one of said other compartments to be operated by the air therein, a normally closed valve rendering the signal inoperative and actuated to open position prior to the rendition of such means inoperative, the pressure responsive element being actuated to normal position permitting said means to function to sever communication between the common air inlet and said other compartments when the air pressure therein is sufficient to overcome the air pressure in the first mentioned compartments, the signal control valve being returned to closed position incident to the return movement of the pressure responsive element.

11. In a pneumatic tire inflating apparatus, a casing having a pair of air compartments, a pressure responsive element separating the compartments, the casing also having a common air inlet which leads to both compartments, manually operable means controlling the admission of air to one compartment, a normally seated valve in the common inlet severing communication between the latter and the other compartment, and operable to open the valve and to permit air pressure to enter the said other compartment, an inflating conduit leading from said other compartment, a pneumatic signal communicating with the last mentioned compartment, a normally closed slide valve for rendering the signal inoperative, means operable incident to the actuation of the pressure responsive element in one direction to open the slide valve prior to admission of air to the last mentioned compartment, the pressure responsive element being returned to normal position severing further communication between the inflating conduit and said air inlet, and closing the slide valve, upon pressure in the tire overcoming the resistance of the air in the first mentioned compartment.

12. In a pneumatic tire inflating apparatus, a casing having a pair of air compartments, a pressure responsive element separating the compartments, the casing having a common air inlet which leads to both compartments, manually operable means controlling the admission of air to one compartment, a normally seated valve in the common inlet severing communication between the latter and the other compartment and operable to open the valve and to permit air pressure to enter the last mentioned compartment, an inflating conduit leading from said last mentioned compartment, a pneumatic signal communicating with the last mentioned compartment, a normally closed slide valve for rendering the signal inoperative, means operable incident to the actuation of the pressure responsive element in one direction to open the slide valve prior to admission of air to said last mentioned compartment, the pressure responsive element being returned to normal position severing further communication between the inflating conduit and said air inlet and closing the slide valve upon pressure in the tire overcoming the resistance of the air in the first mentioned compartment, and a pressure gauge for determining the operating pressure at which the pressure supply to the tire is cut off.

13. In a pneumatic tire inflating apparatus, a casing having a pair of air compartments, a pressure responsive element separating the compartments, the casing having a common air inlet which leads to both compartments, manually operable means controlling the admission of air to one compartment, a normally seated valve in the common inlet severing communication between the latter and the other compartment and operable to open position to permit air pressure to enter the last mentioned compartment, an inflating conduit leading from said last mentioned compartment, a pneumatic signal communicating with the last mentioned compartment, a normally closed slide valve for rendering the signal inoperative, means operable incident to the actuation of the pressure responsive element in one direction to open the slide valve prior to the admission of air into the last mentioned compartment, the pressure responsive element being returned to normal position to sever further communication between the inflating conduit and the air inlet and to close the slide valve upon pressure in the tire overcoming the resistance of air in the first mentioned compartment, a pressure gauge for determining the operating pressure at which the pressure supply to the tire is cut off, and means for varying the operating pressure.

14. In a pneumatic tire inflating apparatus, a casing having a pair of air compartments, a pressure responsive element separating the compartments, the casing having a common air inlet which leads to both compartments, manually operable means controlling the admission of air to one compartment, a normally seated valve in the common inlet severing communication between the latter and the other compartment and operable to open the valve and to permit air pressure to enter the last mentioned compartment, an inflating conduit leading from said last mentioned compartment, a pneumatic signal communicating with the last mentioned compartment, a normally closed slide valve for rendering the signal inoperative, means operable incident to the actuation of the pressure responsive element in one direction to open the slide valve prior to the admission of air into said last mentioned compartment, the pressure responsive element being returned to normal position to sever further communication between the inflating conduit and air inlet and closing the slide valve upon pressure in the tire overcoming the resistance of the air in the first mentioned compartment, a pressure gauge for determining the operating pressure at which the pressure supply to the tire is cut off, and means operable to exhaust a predetermined air pressure from the first mentioned chamber in the event that the gauge indicates a greater pressure than the pressure desired.

15. In a pneumatic tire inflating and deflating apparatus, a casing having air compartments therein, a pressure responsive element separating the compartments, the casing also having a common air inlet leading to both compartments, a valve normally severing communication between the air inlet and one of the compartments, a tire air supply conduit leading from said compartment, a manually operable valve controlling communication between the common air inlet and the other compartment and adapted to permit a predetermined air pressure to enter the latter to actuate the air responsive element toward the normally closed valve, means carried by the pressure responsive element for holding said valve open to permit air to pass to the tire supply conduit, the pressure of the air in the tire when inflated being transmitted back to the first mentioned compartment to return the pressure responsive element to normal position thereby cutting off further pressure to the tire, an inflating signal operable during the inflation operation and a deflation signal operable in the event that the tire pressure is greater than the pressure in the said other compartment and permitting the air pressure in the tire to exhaust until it equals the pressure in said other compartment.

16. In an inflating apparatus, a casing having air compartments both of which have communication with a source of compressed air, a flexible diaphragm separating the two compartments, a piston movable in one compartment and fixed to the diaphragm, a normally closed reciprocable valve controlling the passage of air to said compartment, a valve unseating element carried by the piston, a manually operable valve for permitting air to pass into the compartment whereby to actuate the diaphragm and advance the piston to engage the valve unseating element with the valve to permit air pressure to enter the first mentioned compartment, and a tire pressure supply conduit leading from said first mentioned compartment, the tire pressure being communicated to said first mentioned compartment to return the piston and diaphragm to normal position when the air pressure from the tire overcomes the resistance offered by the air in the said other compartment.

17. In an inflating apparatus, a casing having air compartments both of which have communication with a source of compressed air, a flexible diaphragm separating the two compartments, a piston movable in one compartment and fixed to the diaphragm, a normally closed reciprocable valve controlling the passage of air to said compartment, a valve unseating element carried by the diaphragm, and a manually operable valve for permitting air to pass into the other compartment whereby to actuate the diaphragm to engage the valve unseating element with the valve to permit air pressure to enter the first mentioned compartment, a tire pressure supply conduit leading from said first mentioned compartment, the pressure of the air in the tire being communicated to said compartment to return the piston and diaphragm to normal position when the air pressure from the tire overcomes the resistance offered by the air in the said other compartment, a normally closed pneumatic signal control valve slidable in the casing below the piston, a pivotally supported trigger having one end operatively engaging the valve and a pin projecting from the piston to engage and rock the trigger to slide the valve to open position incident to the initial movement of the latter.

18. In an inflating apparatus, a casing having air compartments both of which have communication with a source of compressed air, a flexible diaphragm separating the two compartments, a piston movable in one compartment and fixed to the diaphragm, a normally closed reciprocable valve controlling the passage of air to the compartment, a valve unseating element carried by the diaphragm, and a manually operable valve for permitting air to pass into the other compartment whereby to actuate the diaphragm and advance the piston to engage the valve unseating element with the valve to permit air pressure to enter the first-mentioned compartment, a tire pressure supply conduit leading from said first-mentioned compartment, the tire pressure being communicated to said compartment to return the piston and diaphragm to normal position when the pressure of the air from the tire overcomes the resistance offered by the air in the said other compartment, a normally closed pneumatic signal control valve slidable in the casing below the piston, a pivotally supported trigger having one end operatively engaging the valve, and a pin projecting from the piston to engage and rock the trigger to slide the valve to open position incident to the initial movement of the latter, and means for returning the trigger to normal position whereby to move the slide valve to closed position.

19. A tire inflating and deflating apparatus including a casing having air chambers and a piston chamber communicating with one air chamber, a reciprocable piston in the piston chamber, a diaphragm on which said piston is mounted and separating the air chambers, the casing also having a common air inlet leading to both chambers, a normally closed spring pressed valve severing communication between the air inlet and one chamber, a valve opening element carried by the diaphragm, a manually operable valve controlling communication between the other air chamber and air inlet and operable to admit air into said other chamber to actuate the diaphragm and piston in a direction to engage the valve unseating element with the spring pressed valve to permit air to pass to the first mentioned chamber and the piston chamber, a tire supply conduit leading from the piston chamber, the pressure of the air in the tire when sufficient to overcome the resistance to the diaphragm of the air pressure from the said other air chamber returning the diaphragm and piston to normal position disengaging the valve unseating element from the valve.

20. A tire inflating and deflating apparatus including a casing having air chambers and a piston chamber communicating with one air chamber, a reciprocable piston in the piston chamber, a diaphragm on which said piston is mounted and separating the air chambers, the casing also having a common air inlet leading to both chambers, a normally closed spring pressed valve severing communication between the air inlet and one chamber, a valve opening element carried by the diaphragm, a manually operable valve controlling communication between the other air chamber and air inlet and operable to admit air into said other chamber to actuate the diaphragm and piston in a direction to engage the valve unseating element with the spring pressed valve to permit air to pass to the first mentioned chamber and the piston chamber, a tire supply conduit leading from the piston chamber, the pressure of the air in the tire when sufficient to overcome the resistance to the diaphragm of the air pressure from the said other air chamber returning the diaphragm and piston to normal position disengaging the valve unseating element from the valve, the piston and casing having normally offset openings which register to permit excess pressure of the air in the tire to exhaust from the tire should the tire pressure be greater than the operating pressure in the said other compartment.

21. A tire inflating and deflating apparatus including a casing having air chambers and a piston chamber communicating with one air chamber, a reciprocable piston in the piston chamber, a diaphragm on which the piston is mounted and separating the air chambers, the casing also having a common air inlet leading to both chambers, a normally closed spring pressed valve severing communication between the air inlet and one chamber, a valve opening element carried by the diaphragm, a manually operable valve controlling communication between the other air chamber and air inlet and operable to admit air into said other chamber to actuate the diaphragm and piston in a direction to engage the valve unseating element with the spring pressed valve to permit air to pass to the first mentioned chamber and the piston chamber, a tire supply conduit leading from the piston chamber, the pressure of the air in the tire when sufficient to overcome the resistance to the diaphragm of the air pressure from the said other air chamber returning the diaphragm and piston to normal position disengaging the valve unseating element from the valve, the piston and casing having normally offset openings which register to permit excess pressure of the air in the tire to exhaust from the tire should the pressure of the air in the tire be greater than the operating pressure in the said other compartment, and a signal operated by the exhaust surplus air.

22. A tire inflating and deflating apparatus including a casing having air chambers and a piston chamber communicating with one air chamber, a reciprocable piston in the piston chamber, a diaphragm by which said piston is mounted and separating the air chambers, the casing also having a common air inlet leading to both chambers, a normally closed spring pressed valve severing communication between the air inlet and one chamber, a valve opening element carried by the diaphragm, a manually operable valve controlling communication between the other air chamber and air inlet and operable to admit air into said other chamber to actuate the diaphragm and piston in a direction to engage the valve unseating element with the spring pressed valve to permit air to pass to the first mentioned chamber and the piston chamber, a tire supply conduit leading from the piston chamber, the pressure of the air in the tire when sufficient to overcome the resistance to the diaphragm of the air pressure from the said other air chamber returning the diaphragm and piston to normal position disengaging the valve unseating element from the valve, the piston and casing having normally offset openings which register to permit excess tire pressure to exhaust from the tire should the pressure of the air in the tire be greater than the operating pressure in the said other compartment, a signal operated by the exhaust surplus air, and a pressure gauge communicating with the first mentioned compartment for determining the tire pressure.

23. In combination, a casing having air chambers therein, a diaphragm separating the chambers, a piston movable with the diaphragm and having a bleed port, the casing having a common air inlet leading to both chambers, an automatically operable valve normally severing communication between the inlet and one chamber, the casing being also provided with a normally closed by-pass leading from a point adjacent one end of the piston and opening adjacent the diaphragm, means controlling communication between the inlet and the other chamber to permit the introduction of operating pressure thereto to actuate the diaphragm and piston towards the automatically operable valve to hold the latter in open position to permit air pressure from the inlet to enter the first mentioned chamber, and a conduit leading from the first mentioned chamber for supplying air to a tire, the normally closed by-pass being opened to discharge air pressure quickly in the zone of the diaphragm to instantaneously return the diaphragm and piston to normal position when the tire has been inflated to the same pressure as the operating pressure.

WILLIAM A. HARRIS.